J. N. WYCKOFF & T. M. FELL.
AMALGAMATOR.
No. 24,902. Patented July 26, 1859.
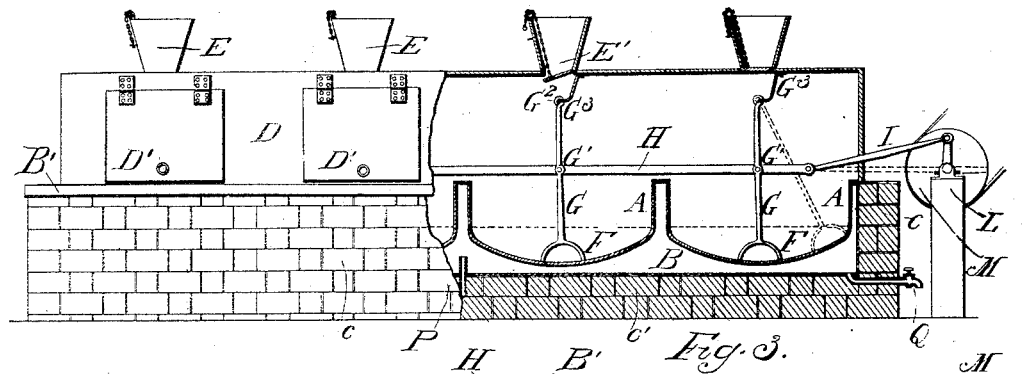
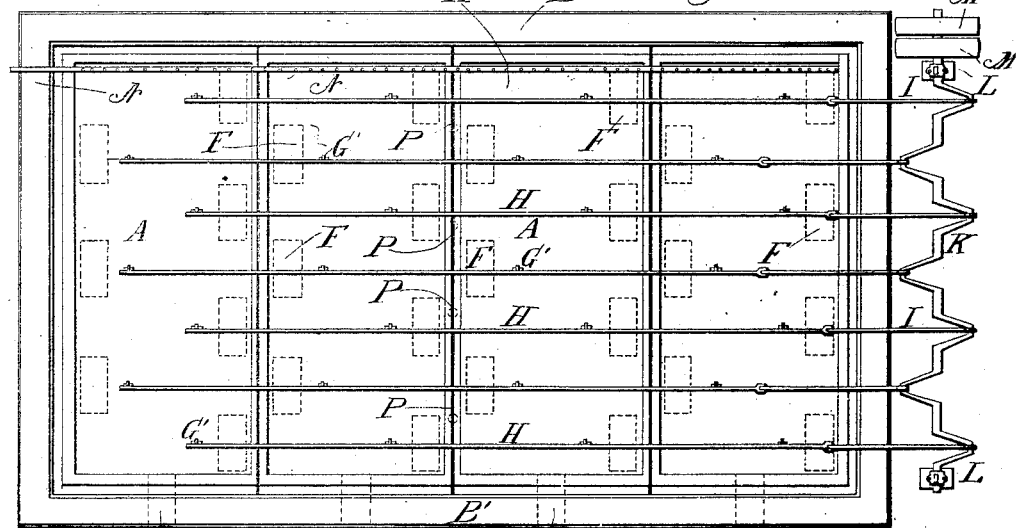
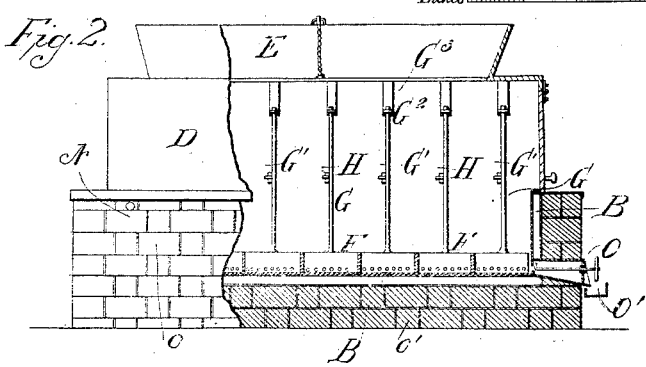

UNITED STATES PATENT OFFICE.

T. M. FELL, OF ORANGE COUNTY, VIRGINIA, AND J. N. WYCKOFF, OF BROOKLYN, NEW YORK.

GOLD-AMALGAMATOR.

Specification of Letters Patent No. 24,902, dated July 26, 1859.

*To all whom it may concern:*

Be it known that we, THOMAS M. FELL, of Orange county, State of Virginia, and JOHN N. WYCKOFF, of Brooklyn, Long Island, in the county of Kings, State of New York, have invented certain Improvements in the Reduction of Gold and Silver Ores; and whereas after experimenting at great expense under protection of caveats granted to the said JOHN N. WYCKOFF, dated July 9, 1857, and one granted to said JOHN N. WYCKOFF and said THOMAS M. FELL, dated July 10, 1858, we hereby declare the following to be a full and exact description of our invention.

Gold and silver ores, auriferous sulfuret, sands or tailings having been pounded or ground, by any of the ordinary known means to the required degree of fineness, the whole is passed into a trough or vat, thereby allowing the mud, slime and light silicious material to be driven off. In case of dry grinding by mills, &c., the ore thus prepared may either be treated in this condition, or concentrated by means of water in the trough aforesaid. Concentrated ore, or if the pounded ore be thought of sufficient richness to warrant direct amalgamation, which was the object of the previous concentration to effect, but which however in this case may be dispensed with, is next submitted to an intimate contact with heated mercury in the manner and on the principle as follows: By numerous experiments it was found that mercury heated in a suitable vessel or apparatus by means of steam or vapor of water of about 212 degrees (of Fahr. scale of them.) in the presence of a free alkali, and at sufficient temperature to expand the watery atom in contact with the mercury into vapor, has the property, or capability of coming into intimate contact with the pounded ore and of entering the pores, or small fissures thereof, splitting up, or separating the particles, by means of the unequal expansion of the matrix earth and metallic metals, and thereby dissolving out, or extracting the gold and silver. This combined action of steam, mercury, and free alkali agent is found to take place provided that the increased affinity of mercury obtained by this process, is not destroyed or vitiated by foreign substances, such as sulfur, arsenic, &c., to remove which when in a free state is likewise the object of the previous washing or concentration; but when found in chemical combination such as in the case of auriferous sulfurets, or arseniates, we find it necessary for the full success of our process to burn or calcine the same which is best effected in a common calcining furnace, with 10 per cent. of chlorid of sodium (salt) soda, or other absorbent or repellent material, for the purpose of dispersing the sulfurous or arsenical combinations.

To carry out the theory or particular part of our said invention, we construct an apparatus consisting of a series of vessels, pots, or chambers, with circular, or square bottoms, to hold a charge say of 100 lbs. of mineral more or less according to its size, with the necessary quantity of mercury. (We use 50 lbs. of mercury to 100 lbs. of ore). As a number of these pots or chambers, would be necessary, they are arranged in sets or rows of convenient numbers, and for the purpose of communicating the necessary amount of heat, are placed within a chamber, or surrounded by an exterior casing, into which is introduced steam of at least 212 degrees (of Fahr. scale of them.), thereby heating the contents of the chambers. All that is further necessary is to charge the vessels each with the prepared ore, mercury and a small amount of potash, soda, wood ashes, or other free alkali (say 1 lb. per 100 of ore) for the purpose of keeping the surface of the globules of mercury clean or clear. Any alkali contained in the ore, cannot be considered in a free state, being necessary in combination, forming the alkaline earths, which being of a light clayey nature, is considered injurious to the process by its adhesive consistency, covering or coating the small particles of mercury. The same is therefore driven off during the previous washing process, sufficient pure water being added to cover the contents. The mass is kept continually triturated or well mixed in the manner hereinafter explained. In practice one hour is considered sufficient time, when the charge is removed, first adding an additional quantity of fresh water to enable the mercury to sink in bulk to the lower portion of the vessel. The time however may be varied to suit particular ores, which can only be determined by extensive workings and quantity worked. Each charge is succeeded by another until the mercury is found sufficiently rich to evaporate for the gold contained, the now removed ore being washed over a common shaking table (as now used) to recover any amalgam that would otherwise be lost.

Figure 1 front elevation, Fig. 2 side elevation, Fig. 3 plan of our open round bottomed amalgamator worked by steam, a description of which will better illustrate practically the principle or mode of our plan of amalgamation.

A A, vessels or amalgamators, a series of four surrounded by the steam chamber (B); B', flange of chambers (B) resting on the brick wall (C); C', foundation of brickwork; D, cover of wood one inch plank, with doors or slides (D'); E, hoppers for holding a charge; F, iron stirrers, ¼ of an inch plate, bent and perforated with inch holes as shown; G, iron pendulum or rod—connected at (G') to rods (H) and held on pivot (G²) by support (G³) which is again connected by crank rods (I) to driving crank shaft (K); L, the usual plumber blocks and brakes and (M) loose and fast pulleys for driving the whole, by means of a mill band or strap; N, water pipe (Fig. 3) perforated along its entire length (crossing the width and one end of the four pans) with small holes so as to distribute and supply necessary amount of water; O, discharge valves; O', gutter; P, supply of steam; Q, discharge for condensed water or steam.

For this size machine 200 lbs. of the prepared ore and alkali being put into the hopper E forming a measure, the same is allowed to fall into the amalgamator A, by means of the trap and chain E'. Motion being given to the pulleys M, the rods I and H drive the pendulum G which causes the stirrer F to circumscribe the bottom of the vessel A (as shown in Fig. 1) alternatively from side to side. Mercury and water being put into each, steam is let on through the pipes P, P, which circulates around the sides and bottom heating all over at the required degree of temperature. The space occupied by the charge or contents of the pans is shown by the dotted lines in Fig. 1. At the end of the operation of mixing or stirring the same is discharged; first letting on a further supply of water by the pipe N, in order to sink the mercury to the bottom below the line dotted in Fig. 2, which consequently remains in the pan A to the level of the discharge valve O. In order that no portion of the previous charge shall remain within the pans the water is allowed to run through from the pipe N, out of the discharge O, till clear, which will take about 10 minutes each charge. By the gutter O' the now amalgamated ore is conducted to a box (not shown) from which it is removed as wanted, for the purpose of washing out any remaining amalgam.

It is obvious that the above described apparatus or plan of amalgamation is susceptible of many modifications, for instance the vessels may be heated by the direct application of fire and as before mentioned may be entirely surrounded by steam, in which case they would form cylinders or inclosed chambers. We however prefer the open vessels as specified, so far as our experiments have yet determined, on account of the ease of discharging the same; or the stirring instead of the stirrers as above specified may be done by the vessels themselves receiving circular motion assisted by the insertion of pieces of any hard material revolving in contact, the object being to secure constant and good triturating or stirring of the contents.

We therefore do not confine ourselves to the exact details as herein described, but What we especially claim as our invention is—

The application of heat by steam or otherwise to vessels, pans or cylinders, keeping the contents well triturated or mixed at an elevated temperature—the whole operating in the manner herein described, so as to amalgamate the prepared ore by the use of mercury and alkali as specified.

THOS. M. FELL. [L. S.]
JOHN N. WYCKOFF. [L. S.]

Witnesses:
JOHNS HOLLINGSHEAD,
AMEN DUVALL.